(12) United States Patent
Xiao et al.

(10) Patent No.: US 10,374,331 B2
(45) Date of Patent: Aug. 6, 2019

(54) WIRE CONNECTOR, AND POWER SUPPLY ASSEMBLY AND AERIAL VEHICLE USING THE WIRE CONNECTOR

(71) Applicant: SZ DJI TECHNOLOGY CO., LTD., Shenzhen (CN)

(72) Inventors: Wenlong Xiao, Shenzhen (CN); Zhuang Feng, Shenzhen (CN); Yongsheng Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 313 days.

(21) Appl. No.: 15/414,926

(22) Filed: Jan. 25, 2017

(65) Prior Publication Data

US 2017/0133771 A1 May 11, 2017

Related U.S. Application Data

(63) Continuation of application No. PCT/CN2014/083173, filed on Jul. 28, 2014.

(51) Int. Cl.
*B64C 27/08* (2006.01)
*H01R 4/38* (2006.01)
(Continued)

(52) U.S. Cl.
CPC ............ *H01R 4/38* (2013.01); *B64C 39/024* (2013.01); *B64D 27/24* (2013.01); *H01R 31/02* (2013.01);
(Continued)

(58) Field of Classification Search
CPC ... H01R 4/26; H01R 4/28; H01R 4/30; H01R 4/38; H01R 4/42; H01R 12/515;
(Continued)

(56) References Cited

U.S. PATENT DOCUMENTS

| 6,042,431 A | * | 3/2000 | Hayakawa | ............ H01R 4/305 439/801 |
| 8,882,547 B2 | * | 11/2014 | Asakuma | ................. H01R 4/42 439/810 |
| 2014/0099853 A1 | * | 4/2014 | Condon | ............... G05D 1/0033 446/37 |

FOREIGN PATENT DOCUMENTS

| CN | 201001011 Y | 1/2008 |
| CN | 101868884 A | 10/2010 |

(Continued)

OTHER PUBLICATIONS

The World Intellectual Property Organization (WIPO) International Search Report for PCT/CN2014/083173 dated Dec. 30, 2014, p. 1-6.

*Primary Examiner* — Richard G Davis
(74) *Attorney, Agent, or Firm* — Anova Law Group, PLLC (57) ABSTRACT

The present disclosure relates to a wire connector, and a power supply assembly and an aerial vehicle using the wire connector. The aerial vehicle comprises a support frame, and a power supply assembly and a plurality of rotor assemblies arranged on the support frame. The rotor assemblies are electrically connected with the power supply assembly. The power supply assembly comprises a circuit board, a power source, wires electrically connected with the power source, and wire connectors arranged on the circuit board. The wires each comprise a conductive portion. The wire connectors each comprise a conductive member, a movable member, and an adjusting member. The movable member is arranged facing the conductive member. The conductive portion is located between the movable member and the conductive member. The adjusting member is arranged on the conductive member and penetrates through the conductive portion and the movable member.

3 Claims, 6 Drawing Sheets

(51) Int. Cl.
*H01R 31/02* (2006.01)
*B64C 39/02* (2006.01)
*B64D 27/24* (2006.01)
*H01R 12/51* (2011.01)
*H01R 4/44* (2006.01)

(52) U.S. Cl.
CPC .. *B64C 2201/027* (2013.01); *B64C 2201/042* (2013.01); *B64C 2201/108* (2013.01); *B64C 2201/127* (2013.01); *H01R 4/44* (2013.01); *H01R 12/515* (2013.01)

(58) Field of Classification Search
CPC .............. H01R 31/02; B64C 2201/027; B64C 2201/042; B64C 2201/108
See application file for complete search history.

(56) References Cited

FOREIGN PATENT DOCUMENTS

| | | |
|---|---|---|
| CN | 202308340 U | 7/2012 |
| CN | 202585781 U | 12/2012 |
| CN | 202717030 U | 2/2013 |
| CN | 202728572 U | 2/2013 |
| CN | 203521660 U | 4/2014 |
| CN | 103908785 A | 7/2014 |
| CN | 204179455 U | 2/2015 |
| JP | S62065774 U | 4/1987 |
| JP | H11250960 A | 9/1999 |
| JP | 2002050417 A | 2/2002 |
| JP | 2003028126 A | 1/2003 |
| JP | 2013020806 A | 1/2013 |
| TW | 426245 U | 3/2001 |

\* cited by examiner

WIRE CONNECTOR, AND POWER SUPPLY ASSEMBLY AND AERIAL VEHICLE USING THE WIRE CONNECTOR

CROSS-REFERENCE TO RELATED APPLICATION

This is a continuation application of International Application No. PCT/CN2014/083173, filed on Jul. 28, 2014, the entire contents of which are incorporated herein by reference.

TECHNICAL FIELD

The present disclosure relates to a power distribution wire connector, and a power supply assembly and an aerial vehicle using the power distribution wire connector.

BACKGROUND

Aerial photography is emerging with the development of science and technology, and unmanned aerial vehicle (UAV) aerial photography has been increasingly favored by photographers due to its lower cost and increased safety as compared with manned aerial vehicle photography. An UAV photographing task may typically be performed by shooting with an electronic device such as a camcorder or a camera carried by an aerial vehicle. A commonly used aerial vehicle may be a multi-rotor aerial vehicle comprising a power supply assembly, a support frame connected with the power supply assembly, and a plurality of rotor assemblies respectively arranged on the support frame; the power supply assembly may comprise a power source and power distribution wire connectors through which the power source may be electrically connected with and provide electric power to the plurality of rotor assemblies, respectively. A conventional power distribution wire connector may achieve power distribution after being electrically connected to the power source by a connecting member having an elastic snap structure or by soldering. However, with the connecting member having the elastic snap structure, poor engagement may occur when the connecting member is snap-fitted to the wire connector due to low manufacture precision of the connecting member; and shake generated by the aerial vehicle during flight may also lead to poor contact of the snap structure, thereby adversely affecting the supply of power to the aerial vehicle; moreover, the elastic snap may be prone to deformation and damage after long-term use, which may shorten the service life thereof. Although the problem of poor contact may be avoided by soldering, soldered structures may be difficult to assemble.

SUMMARY

In view of the above, there is a need to provide a power distribution wire connector having reliable electrical contact and being easy to assembly, and a power supply assembly and an aerial vehicle using the power distribution wire connector.

The present disclosure provides a wire connector, which may comprise a conductive member for connecting a wire, said wire comprising a conductive portion, and said conductive member comprising a stacking portion and supporting portions formed on the stacking portion; the wire connector may further comprise a movable member and an adjusting member; the movable member may be arranged adjacent to the stacking portion and may comprise an abutting surface facing the stacking portion; the conductive portion of the wire may be received between the abutting surface and the stacking portion; the adjusting member may be arranged on the stacking portion and penetrate through the conductive portion and the movable member, and the adjusting member may be rotatable to drive the abutting surface of the movable member to slide along the supporting portions to push against the conductive portion to bring it into proximity to the stacking portion, thereby bringing the conductive portion into contact and electrical communication with the conductive member.

The present disclosure further provides an aerial vehicle, which may comprise a support frame, and a power supply assembly and a plurality of rotor assemblies arranged on the support frame; the plurality of rotor assemblies may be respectively electrically connected with the power supply assembly; the power supply assembly may comprise a circuit board, a power source, and a wire electrically connected with the power source; the wire may comprise a conductive portion; the power supply assembly may further comprise a wire connector comprising a conductive member, a movable member and an adjusting member; the conductive member may comprise a stacking portion and supporting portions formed on the stacking portion; the supporting portions may be fixed on the circuit board; the movable member may be arranged adjacent to the stacking portion and may comprise an abutting surface facing the stacking portion; the conductive portion may be received between the abutting surface and the stacking portion; the adjusting member may be arranged on the stacking portion and penetrate through the conductive portion and the movable member; and the adjusting member may be rotatable to drive the abutting surface of the movable member to slide along the supporting portions to push against the conductive portion to bring it into proximity to the stacking portion, thereby bringing the conductive portion into contact and electrical communication with the conductive member.

The present disclosure further provides a power supply assembly, which may comprise a circuit board, a power source, and a plurality of wires electrically connected with the power source; the plurality of wires may be configured to be connected with an external device; the power supply assembly may further comprises a plurality of wire connectors arranged on the circuit board; the number of the wire connectors may be even, and the number of the wires may be twice of that of the wire connectors; every adjacent two of the wire connectors may be connected respectively with a positive electrode and a negative electrode of the power source; every two of the wires may be grouped together and connected on the same wire connector to connect to the positive electrode or the negative electrode of the power source; each of the wires may comprise a conductive portion; each of the wire connectors may comprise a conductive member, a movable member and an adjusting member; the conductive member may comprise a stacking portion and supporting portions formed on the stacking portion; the supporting portions may be fixed on the circuit board; the movable member may be arranged adjacent to the stacking portion; the conductive portions of every two of the wires may be received between the corresponding movable member and the stacking portion; the adjusting member may be arranged on the stacking portion and penetrate through the conductive portions and the movable member; and the adjusting member may be rotatable to drive an abutting surface of the movable member to slide along the supporting portions to push against the conductive portions to bring them into proximity to the stacking portion, thereby bringing the conductive portions into contact and electrical communication with the conductive member.

The present disclosure further provides another aerial vehicle, which may comprise a support frame and a plurality of rotor assemblies arranged on the support frame; the aerial vehicle may further comprise the power supply assembly as described above; the power supply assembly may be arranged in the support frame; the number of the rotor assemblies may be the same as the number of the wire connectors; and both one of a group of wires connected with the positive electrode of the power source and a wire connected with the negative electrode of the power source and adjacent to said one of a group of wires may be connected to one of the rotor assemblies.

In the aerial vehicle provided by the present disclosure, the conductive member of the power supply assembly may be fixed on the circuit board, the movable member may be slidably arranged in the conductive member, and the movable member may be able to drive the conductive portion of the wire to move towards the stacking portion of the conductive member by engaging with the adjusting member such that the conductive portion may come into contact and electrically communication with the stacking portion, thus the aforementioned power supply assembly may be easy to assemble and convenient to dissemble. Since the adjusting member may be engaged with the movable member, the movable member and the conductive member may together clamp the conductive portion, so that the wire may reliably contact the conductive member to thereby avoid this engagement structure from being loosened due to shake. Moreover, as the same electrode is shared by two wires for power distribution, the number of wire connectors may be reduced, the wiring structure on the circuit board may be simplified, and the cost of production may be lowered.

REFERENCE NUMERALS FOR MAIN ELEMENTS

TABLE 1

| Aerial vehicle | 300 |
| Support frame | 320 |
| Housing member | 322 |
| Supporting member | 324 |
| Rotor assembly | 340 |
| Motor | 342 |
| Rotor | 344 |
| Power supply assembly | 100, 200 |
| Power source | 101, 201 |
| Power source body | 1011 |
| First power line | 1013 |

TABLE 1-continued

| Second power line | 1015 |
| Circuit board | 10, 210 |
| First wiring | 12 |
| Second wiring | 14 |
| Connecting member | 2101 |
| Plug-in hole | 2103 |
| Wire | 20, 220 |
| Cable | 22 |
| Conductive portion | 24 |
| Through-hole | 241 |
| Wire connector | 30 |
| Conductive member | 33 |
| Body | 331 |
| Stacking portion | 3311 |
| Penetration hole | 3312 |
| Supporting portion | 3313 |
| Receiving space | 3315 |
| Connecting pin | 333 |
| Movable member | 35 |
| Abutting surface | 350 |
| Sliding slot | 351 |
| Connecting hole | 353 |
| Adjusting member | 37, 237 |
| Abutting portion | 371, 2371 |
| Adjusting portion | 373 |
| Protection member | 39, 239 |
| Top wall | 391, 2391 |
| Side wall | 393, 2395 |
| Snap | 395 |
| Hook | 3951 |
| Fitting hole | 2390 |
| Limiting hole | 2392 |
| Connecting portion | 2393 |
| Fastener | 2394 |

The present disclosure will be further described below in particular embodiments with reference to the drawings.

DETAILED DESCRIPTION OF THE DISCLOSURE

Figure 1:
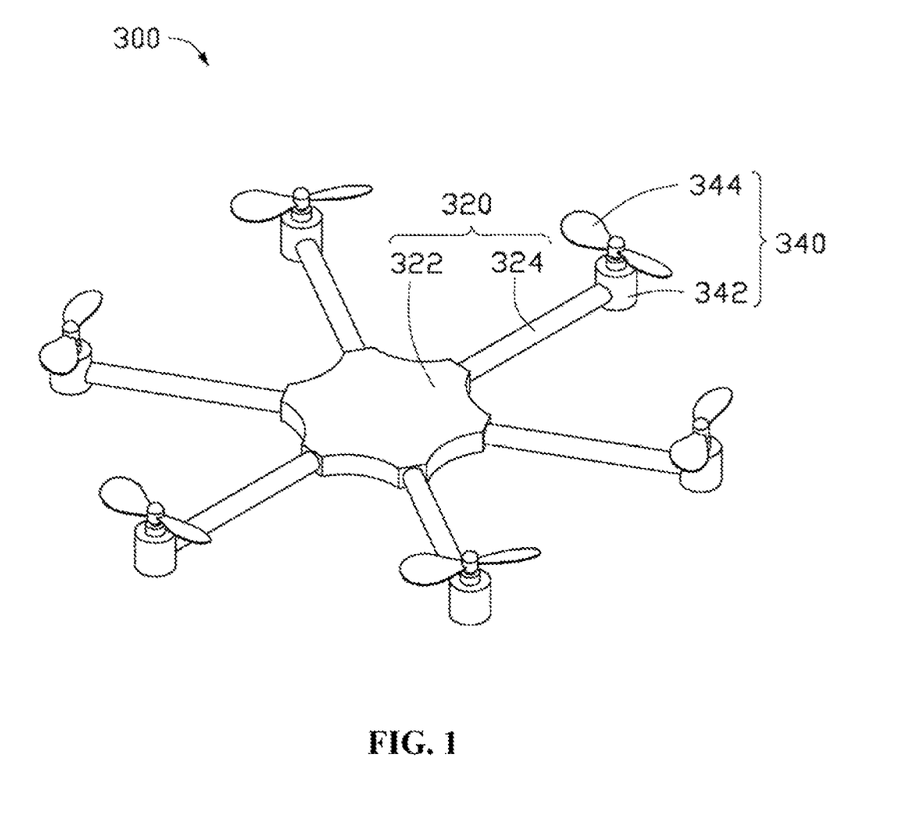
FIG. 1 is a schematic diagram of an aerial vehicle according to a first embodiment of the disclosure.
Figure 2:
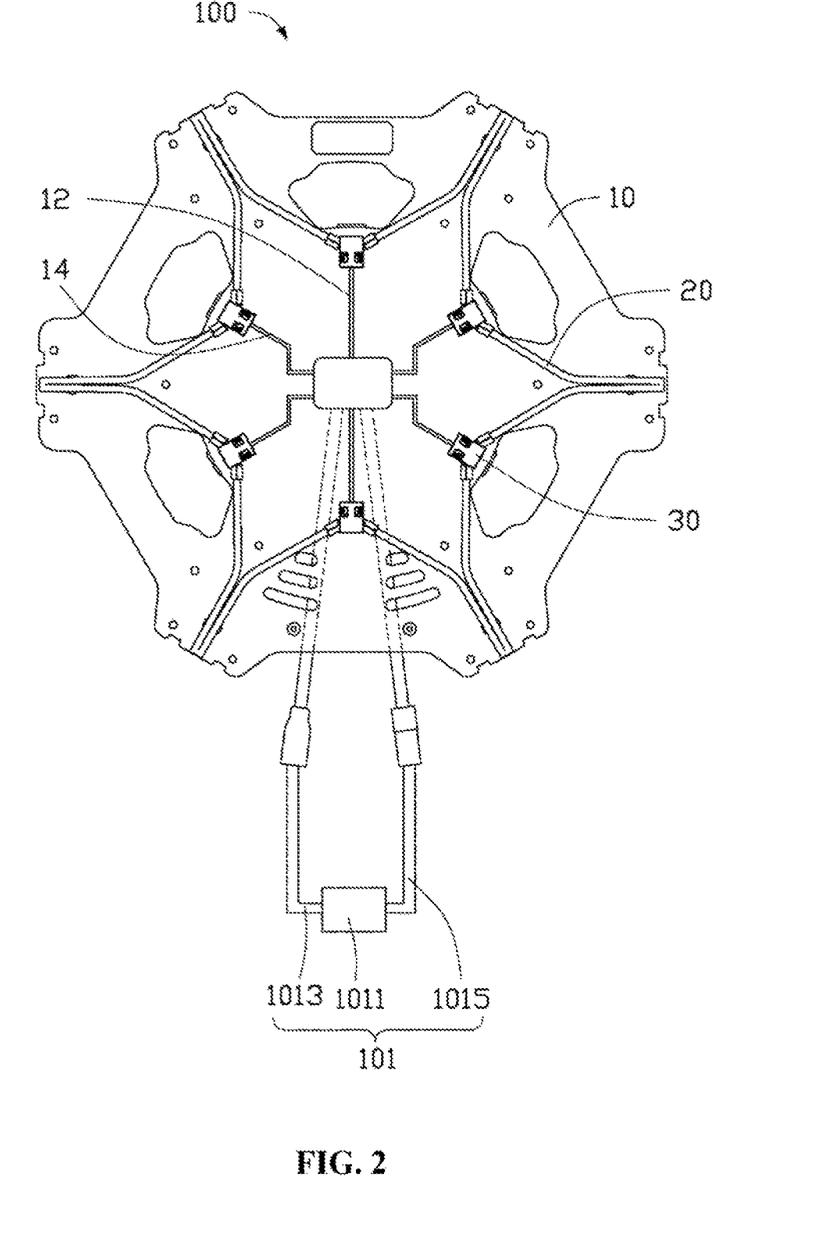
FIG. 2 is a top view of a power supply assembly of the aerial vehicle illustrated in FIG. 1.

Referring to FIGS. 1 and 2, the disclosure provides an aerial vehicle 300 for carrying an electronic device such as a camcorder or a camera (not shown) to perform film or photo shooting. The aerial vehicle 300 may comprise a support frame 320, rotor assemblies 340 and a power supply assembly 100 arranged respectively on the support frame 320.

In this embodiment, the aerial vehicle 300 may be a six-rotor aerial vehicle, and the support frame 320 may comprise a housing member 322 and supporting members 324 connected on the housing member 322. The housing member 322 may be configured to house and hold the power supply assembly 100.

In this embodiment, there may be six supporting members 324, which may be evenly distributed on the housing member 322 and extend in a direction away from the housing member 322. There may also be six rotor assemblies 340, each of which may be mounted at an end of a corresponding one of the supporting members 324. Each of the rotor assemblies 340 may comprise a motor 342 and a rotor 344 electrically connected with the motor 342. In this embodiment, the motor 342 may be a brushless motor configured to drive a rotation of the rotor 344.

The power supply assembly 100 may be mounted on the housing member 322 and electrically connected with the motors 342 so as to provide a source of power to the aerial vehicle 300. The power supply assembly 100 may comprise a power source 101, a circuit board 10 electrically connected with the power source 101, and wires 20 and wire connectors 30 arranged on the circuit board 10. In this embodiment, there may be twelve wires 20 and six wire connectors 30, corresponding to the six-rotor aerial vehicle 300. The six wire connectors 30 may be evenly distributed on the circuit board 10 approximately in a ring, and electrically connected with the power source 101 through the circuit board 10, wherein two of the wires 20 may be connected on each of the wire connectors 30.

The power source 101 may be fixed in the housing member 233, and may comprise a power source body 1011, a first power line 1013 connected to a positive electrode of the power source body 1011, and a second power line 1015 connected to a negative electrode of the power source body 1011.

The circuit board 10 may be approximately shaped as a hexagonal plate, and may be fixedly arranged in the housing member 322 adjacent to the power source 101. An approximately central position of the circuit board 10 may be connected to and in electrical communication with ends of the first power line 1013 and second power line 1015 distal to the power source body 1011. Six conductive wirings extending radially from the approximately central position to the edge of the circuit board 10 may be formed thereon, wherein three of the six conductive wirings may be first wirings 12 connected with the first power line 1013, and the other three may be second wirings 14 connected with the second power line 1015, respectively. The first wirings 12 and second wirings 14 may be alternately arranged and the six conductive wirings may be configured to respectively connect circuits to the six wire connectors 30.

Figure 3:
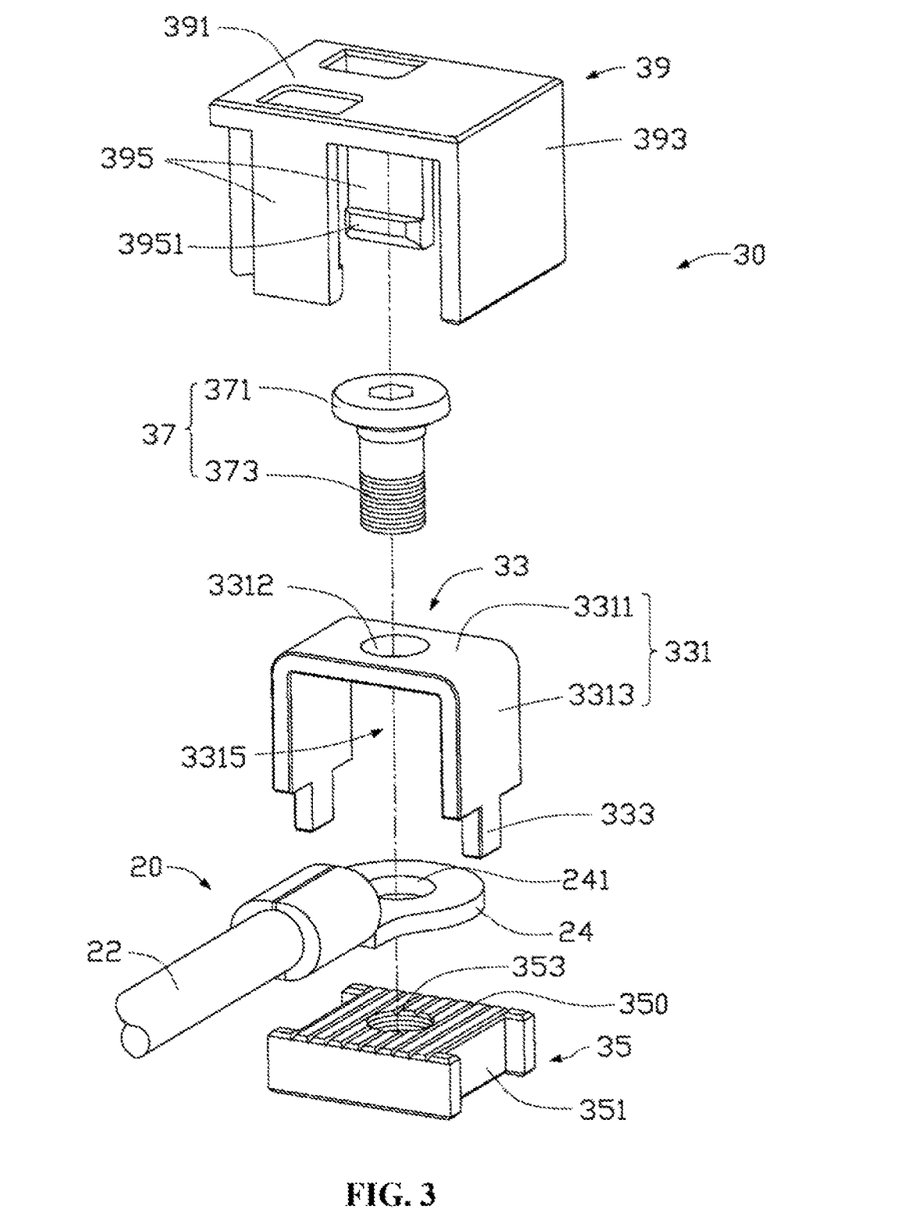
FIG. 3 is an exploded view of a wire connector of the power supply assembly illustrated in FIG. 2.

Also referring to FIG. 3, each of the wires 20 may comprise a cable 22 and a conductive portion 24 formed on one end of the cable 22. The cable 22 may be coated with an insulating layer to ensure electrical safety of the power supply assembly 100. The conductive portion 24 may be approximately shaped as a ring and may be made of a bare conductive material to electrically connect with another wire 20. A through-hole 241 may be provided at an approximately central position of the conductive portion 24.

In some embodiment, each of the wire connectors 30 may be arranged on the circuit board 10 corresponding to one of the conductive wirings. Each of the wire connectors 30 may comprise a conductive member 33, a movable member 35 and an adjusting member 37 arranged in the conductive member 33, and a protection member 39 mounted on the circuit board 10.

The conductive member 33 may comprise a body 331 and connecting pins 333 formed on the body 331. The body 331 may be approximately in a "n" shape, and may comprise a stacking portion 3311 and two supporting portions 3313 formed by bending at both ends of the stacking portion 3311. The stacking portion 3311 may be approximately shaped as a plate, and a penetration hole 3312 penetrating the stacking portion 3311 may be provided in an approximately central position thereof to mount the adjusting member 37. Both of the supporting portions 3313 may be approximately shaped as rectangular plate formed by bending at and extending from both ends of the stacking portion 3311, and may face each other approximately in parallel and perpendicular to the stacking portion 3311. The stacking portion 3311 and the supporting portions 3313 may together enclose a receiving space 3315 configured to receive the movable member 35 and the conductive portions 24 of the wires 20. In some embodiments, there may be two connecting pins 333, each of which may be respectively formed at one end of a corresponding one of the supporting portions 3313 distal to the stacking portion 3311. The connecting pins 333 may be configured to connect the body 331 onto the circuit board 10.

Alternatively or additionally, the connecting pins 333 may be connected with the circuit board 10 by soldering, and may be in electrical communication with the corresponding conductive wirings on the circuit board 10.

The movable member 35 may be approximately an "H-shaped" block movably arranged in the receiving space 3315 and may face the stacking portion 3311 in parallel. The movable member 35 may comprise an abutting surface 350 facing the stacking portion 3311 and an embossed pattern may be impressed on the abutting surface 350. In some embodiments, the embossed pattern may be a plurality of strip grooves parallel to each other. It will be appreciated that, the embossed pattern can also be designed as grid-like grooves, or grooves in other irregular patterns. The movable member 35 may be concavely provided with sliding slots 351 respectively on two opposite sides thereof, and may be provided with a connecting hole 353 at an approximately central position thereof. Each of the sliding slots 351 may be arranged corresponding to one of the supporting portions 3313, and the movable member 35 may be sleeved on the supporting portions 3313 through the sliding slots 351, so that the conductive portion 24 of the wire 20 may be located between the movable member 35 and the stacking portion 3311. The movable member 35 may be movable in the receiving space 3315 in a longitudinal direction of the supporting portions 3313, so that the abutting surface 350 may be pushed against the conductive portion 24 to bring it into proximity to the stacking portion 3311. The connecting hole 353 may be arranged coaxial with the penetration hole 3312 and the through-hole 241 of the wire 20. In this embodiment, the connecting hole 353 may be a threaded hole configured to be connected with the adjusting member 37.

The adjusting member 37 may be arranged on the conductive member 33 and penetrate through the penetration hole 3312 and the connecting hole 353. In this embodiment, the adjusting member 37 may be a cheese head screw. The adjusting member 37 may comprise an abutting portion 371 and an adjusting portion 373 formed on the abutting portion 371. In this embodiment, the abutting portion 371 may be a hexagon socket head having an approximately circular shape. The diameter of the adjusting portion 373 may be smaller than that of the abutting portion 371, and its end distal to the abutting portion 371 may be provided with external thread. The adjusting portion 373 may penetrate through the penetration hole 3312 and may be threadedly engaged with the connecting hole 353, so that the abutting portion 371 may abut against the stacking portion 3311. When the conductive portion 24 of the wire 20 is received in the receiving space 3315 and located between the stacking portion 3311 and the movable member 35, the adjusting portion 373 may be threadedly engaged with the connecting hole 353 after penetrating through the penetration hole 3312 and the through-hole 241.

In some embodiments, the protection member 39 may be made of an insulation material, and may cover a periphery of the conductive member 33 to ensure electrical safety of the wire connector 30. The protection member 39 may comprise a top wall 391, and side walls 393 and snaps 395 formed on the top wall 391. The top wall 391 may be approximately shaped as a rectangular plate. In this embodiment, there may be two side walls 393, and two snaps 395 as well. The two side walls 393 may be formed respectively by bending at and extending from two opposite sides of the top wall 391, and approximately perpendicular to the top wall 391. The two side walls 393 may abut against the circuit board 10 to support the top wall 391 and structurally reinforce the protection member 39. The two snaps 395 may be formed respectively by bending at and extending from the other two opposite sides of the top wall 391, and arranged parallel to each other. A hook 3951 protruding from an end of each of the snaps 395 distal to the top wall 391 may be formed to snap on the circuit board 10 to enable the protection member 39 to be fixed on the circuit board 10.

During the assembly of the aerial vehicle 300 according to the first embodiment of the disclosure, one of the wire connectors 30 may be assembled first in the following steps: the movable member 35 may be placed on the circuit board 10, and the conductive member 33 may be arranged to cover the movable member 35, so that the two supporting portions 3313 may be inserted respectively into the corresponding sliding slots 351, and the connecting pins 333 may then be fixed on the circuit board 10 by soldering; the conductive portions 24 of two wires 20 may be inserted into the receiving space 3315 respectively from two sides of the conductive member 33, so that the through-holes 241 of the two wires 20 are coaxial with both the penetration hole 3312 and the connecting hole 353, and the adjusting portion 373 of the adjusting member 37 may then be inserted sequentially into the penetration hole 3312 and the two through-holes 241 and threadedly engaged with the connecting hole 353; and an external force may be further applied to the abutting portion 371 of the adjusting member 37 to continuously rotate the adjusting portion 373 so that the movable member 35 may gradually approach the stacking portion 3311 of the conductive member 33 through thread driving, and the movable member 35 may push against the two conductive portions 24 until the conductive portions 24 are clamped by the movable member 35 and the stacking portion 3311 together such that the two conductive portions 24 are stacked and in firm contact with the conductive member 33, and the protection member 39 may then be arranged to cover the periphery of the conductive member 33. When the conductive portions 24 are clamped by the movable member 35 and the stacking portion 3311 together, the embossed pattern of the abutting surface 350 may abut against the conductive portions 24 to increase a friction between the movable member 35 and the conductive portions 24, while the embossed pattern can be slightly deformed so that the conductive portions 24 may be firmly clamped between the movable member 35 and the stacking portion 3311. Subsequently, the remaining five wire connectors 30 and the remaining ten wires 20 may be assembled by repeating the above assembling steps, so that each of the wire connectors 30 may be in electrical communication with a corresponding one of the conductive wirings on the circuit board 10, and every two of the wires 20 may be connected on the same wire connector 30; and the first power line 1013 and second power line 1015 may then be connected on the circuit board 10 and connected respectively with the positive and negative electrodes of the power source body 1011. Next, the circuit board 10 and the power source 101 may be fixed in the housing member 322 of the aerial vehicle 300, the supporting members 324 may be mounted on the housing member 322, and then the motors 342 and the rotors 344 may be mounted on their corresponding supporting members 324. Finally, one of the two wires 20 in the wire connector 30 connected with the first wiring 12 may be picked out and connected to one of the motors 342, and one of the two wires 20 in another wire connector 30 adjacent to said wire connector 30 may be picked out and connected to said motor 342, that is, both the one of the two wires 20 connected with the positive electrode of the power source 101 and the one of the wires 20 connected with the negative electrode of the power source 101 and adjacent to said wire 20 may be connected to one of the rotor assemblies 340 to complete an electrical connection of the one rotor assembly 340; and electrical connections of the remaining five rotor assemblies 340 may be completed by repeating the above steps.

When a wire 20 needs to be detached, the protection member 39 may be detached from the circuit board 10 to release the adjusting member 37, so that the movable member 35 may slide away from the stacking portion 3311 along the supporting portions 3313 until the adjusting portion 373 of the adjusting member 37 is disengaged from the through-hole 241 of the conductive portion 23, and then the conductive portion 24 of the wire 20 may be taken out of the receiving space 3315.

Figure 4:
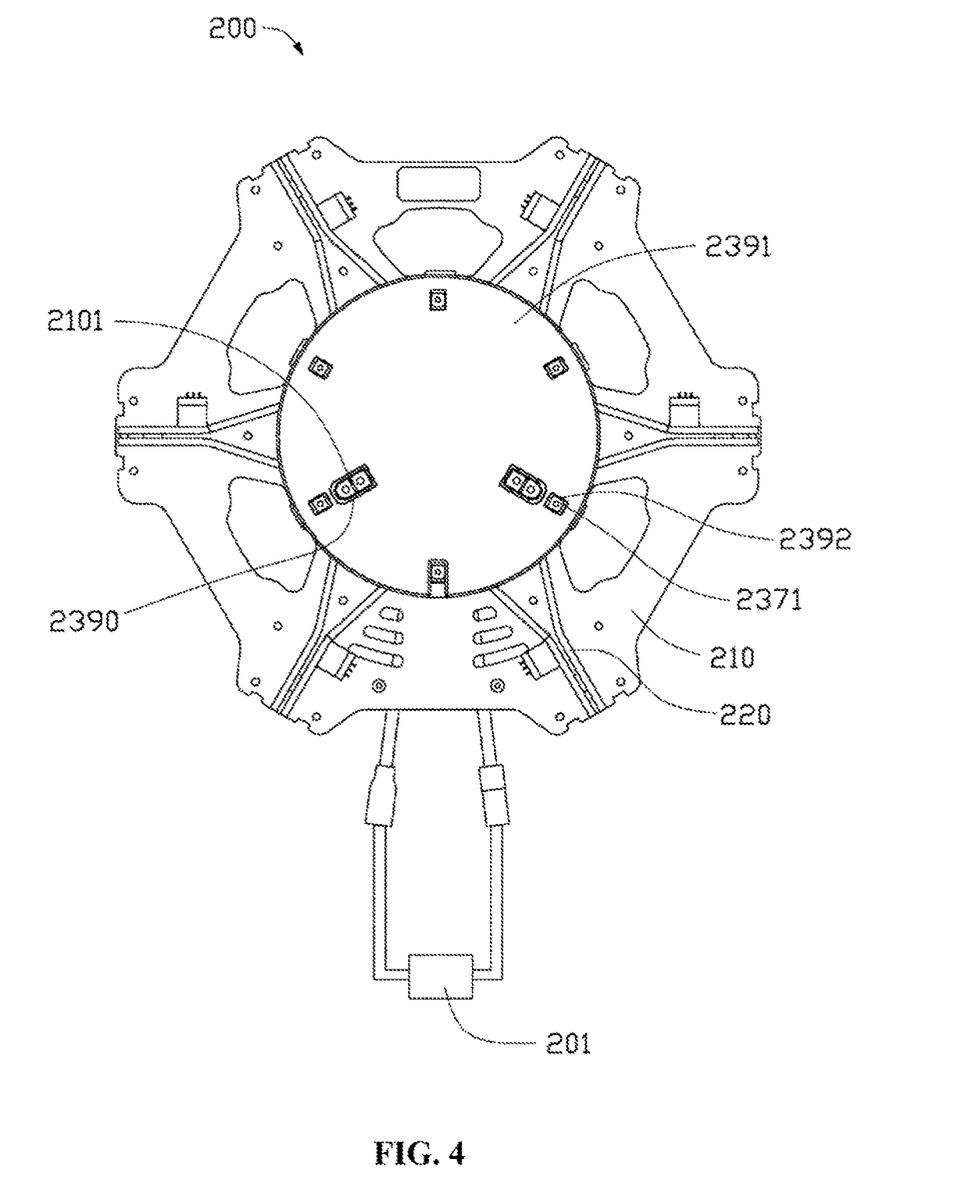
FIG. 4 is a top view of a power supply assembly of an aerial vehicle according to a second embodiment of the disclosure.
Figure 5:
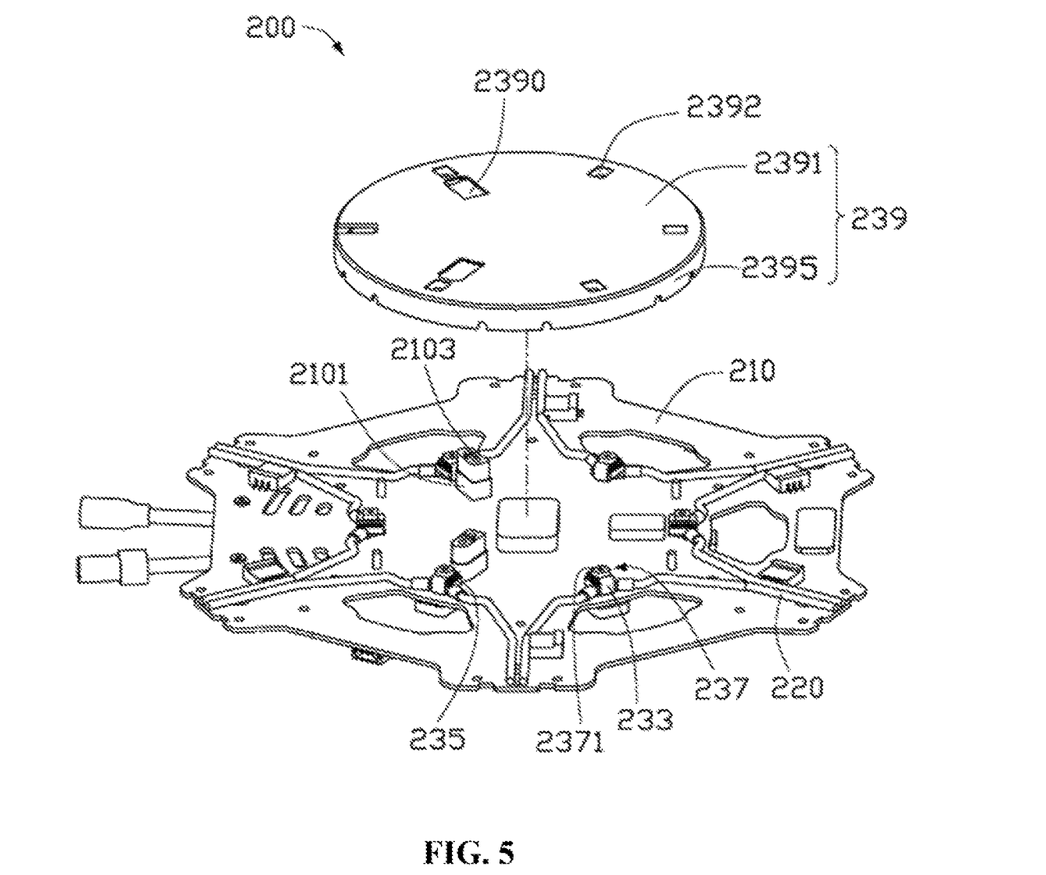
FIG. 5 is an exploded view of the power supply assembly of the aerial vehicle illustrated in FIG. 4.
Figure 6:
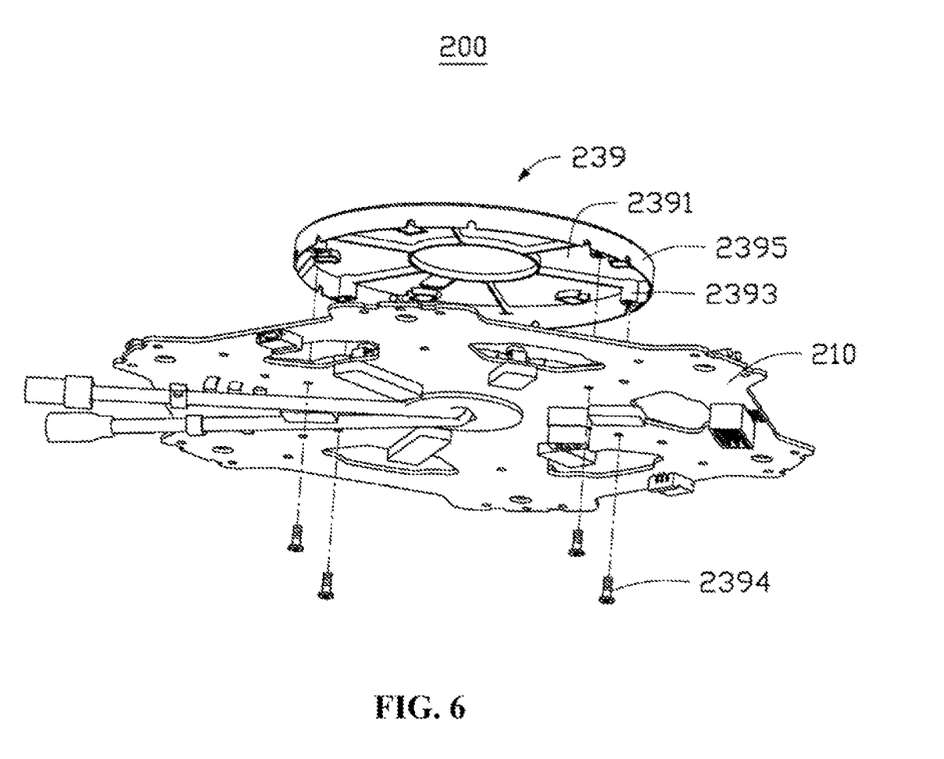
FIG. 6 is an exploded view of the power supply assembly illustrated in FIG. 5 as viewed from another angle.

Referring to FIGS. 4 to 6, an aerial vehicle according to a second embodiment of the disclosure may have a structure approximately the same as that of the aerial vehicle 300 according to the first embodiment of the disclosure, except that an adjusting member 237 of a power supply assembly 200 may be a square head screw, and an abutting portion 2371 thereof may be approximately shaped as a polygon. In this embodiment, the abutting portion 2371 may be shaped as a quadrangle. It will be appreciated that it may also be designed as a pentagon, a hexagon or another geometric shape.

A circuit board 210 may be provided with connecting members 2101 electrically connected with a power source 201 through conductive wirings (not shown) on the circuit board 210. The connecting members 2101 may be configured to be electrically connected with an external device (not shown) to distribute electric power of the power source 201 to the external device, or to enable a power supply assembly 200 to exchange data with the external device. The connecting members 2101 may be provided with plug-in holes 2103 for engaging with mating plugs of the external device. In this embodiment, there may be two connecting members 2101 spacedly arranged on one side of the circuit board 210 on which wires 220 are arranged. It will be appreciated that there can be one or more connecting members 2101, and the connecting member(s) can be arranged on one side of the circuit board 210 away from the wires 220.

In some embodiments, there may be one protection member 239 covering on six conductive members 233. The protection member 239 may comprise a top wall 2391 and a side wall 2395 formed on the top wall 2391. The tap wall 2391 may be approximately shaped as a circular plate, on which six limiting holes 2392 corresponding to the six conductive members 233 and two fitting holes 2390 corresponding to the two connecting members 2101 may be respectively provided. The limiting hole 2392 may have a shape the same as that of the abutting portion 2371 of the corresponding adjusting member 237, and may be configured to stop the abutting portion 2371 from rotating. The fitting hole 2390 may be configured to position the protection member 239, and to receive a part of the structure of the connecting member 2101. Connecting portions 2393 protruding from one side of the top wall 2391 facing the circuit board 210 may be formed thereon. In this embodiment, there may be four connecting portions 2393 spacedly distributed on an edge of the top wall 2391. The connecting portions 2393 may be configured to mate with fasteners 2394 such as screws to lock the protection member 239 onto the circuit board 210. When the protection member 239 covers on the six conductive members 233, the fasteners 2394 may penetrate through the circuit board 210 from one side thereof away from the protection member 239 and may be threadedly engaged with the connecting portions 2393, the abutting portions 2371 may be received in the limiting holes 2392, and a peripheral wall of the abutting portions 2371 may abut against a side wall of the limiting holes 2392, so that the adjusting members 237 can be prevented from rotating due to shake to thereby ensure reliable connections between the wires 220 and the circuit board 210. The side wall 2395 may be formed by the edge of the top wall 2391 extending to the same side and configured to support the top wall 2391.

The assembly method of the aerial vehicle according to the second embodiment of the disclosure may be approximately the same as that of the aerial vehicle 300 according to the first embodiment of the disclosure, and therefore will not be repeated in the specification for the sake of conciseness.

In the aerial vehicle 300 according to the first and second embodiments of the disclosure, the conductive members 33, 233 of the power supply assemblies 100, 200 may be fixed on the circuit board 10, the movable members 35, 235 may be slidably arranged in the conductive members 33, 233, and the movable members 35, 235 may be able to drive the conductive portion 24 of the wires 20, 220 to move towards the stacking portion 3311 of the conductive members 33, 233 by threadedly engaging with the adjusting members 37, 237 such that the conductive portion 24 may come into contact and electrical communication with the stacking portion 3311, thus the power supply assemblies 100, 200 may be easy to assemble and convenient to dissemble. Since the adjusting members 37, 237 may be threadedly engaged with the movable members 35, 235, the movable members 35, 235 and the conductive members 33, 233 may together clamp the conductive portion 24, so that the wires 20, 220 may reliably contact the conductive members 33, 233 to thereby avoid this engagement structure from being loosened due to shake. Moreover, as the same electrode is shared by two wires 20, 220 for power distribution, the number of wire connectors 30 may be reduced, the wiring structure on the circuit boards 10, 210 may be simplified, and the cost of production may be lowered.

It will be appreciated that, in some embodiments, the sliding slots 351 of the movable member 35 can be omitted, and a sliding portion such as a penetration hole or a structure that matches with the supporting portions 3313 may be alternatively arranged on the movable member 35, so long as the movable member 35 can be positioned in the receiving space 3315 and driven by the adjusting member 37 to slide along the supporting portions 3313 towards or away from the stacking portion 3311.

It will be appreciated that the aerial vehicle 300 may be a four-rotor aerial vehicle, an eight-rotor aerial vehicle or another multiple-rotor aerial vehicle, so long as the number of the wire connectors 30 and wires 20 are increased or decreased according to the actual number of the rotors of the aerial vehicle 300.

Moreover, other variations may occur to those skilled in the art without departing from the spirit of the disclosure, and those variations made in accordance with the spirit of the disclosure shall all fall into the scope of the disclosure as claimed.

What is claimed is:

1. A power supply assembly, comprising:
a circuit board;
a power source;
a plurality of wires electrically connected with the power source and configured to be connected with an external device, each of the wires comprising a conductive portion; and
a plurality of wire connectors arranged on the circuit board, wherein:
a number of the wire connectors is an even number and is a half of a number of the wires,
every adjacent two of the wire connectors are connected respectively with a positive electrode and a negative electrode of the power source,
every two of the wires are grouped together and connected on a same wire connector to connect to the positive electrode or the negative electrode of the power source, and
each of the wire connectors comprises:
a conductive member comprising:
a stacking portion; and
supporting portions formed on the stacking portion and fixed on the circuit board;
a movable member arranged adjacent to the stacking portion, the conductive portions of every two of the wires being received between the corresponding movable member and the stacking portion; and
an adjusting member arranged on the stacking portion and penetrating through the conductive portions and the movable member, the adjusting member being configured to rotate to drive an abutting surface of the movable member to slide along the supporting portions to push against the conductive portions to bring the conductive portions into proximity to the stacking portion, thereby bringing the conductive portions into contact and electrical communication with the conductive member.

2. The power supply assembly according to claim 1, wherein:
a plurality of first wirings connected with the positive electrode of the power source and a plurality of second wirings connected with the negative electrode of the power source are alternately arranged on the circuit board, and
each of the wire connectors is arranged on one of the first wirings or the second wirings.

3. An aerial vehicle, comprising:
a support frame;
a plurality of rotor assemblies arranged on the support frame; and
the power supply assembly according to claim 1,
wherein:
the power supply assembly is arranged in the support frame,
a number of the rotor assemblies is the same as a number of the wire connectors, and
each of the rotor assemblies is connected with a first one of the wires that is connected with the positive electrode of the power source and a second one of the wires that is connected with the negative electrode of the power source and adjacent to the first one of the wires.

* * * * *